Jan. 26, 1971 A. GREGORI ET AL Re. 27,039

BIDET

Original Filed Feb. 21 1966 2 Sheets-Sheet 1

Inventors:
Agostino Gregori,
Andrew F. Wintercorn,
Andrew F. Wintercorn
Atty.

BIDET

Original Filed Feb. 21, 1966 2 Sheets-Sheet 2

Inventors:-
Agostino Gregori,
Andrew F. Wintercorn,
Andrew F. Wintercorn Atty.

United States Patent Office

Re. 27,039
Reissued Jan. 26, 1971

27,039
BIDET

Agostino Gregori, Chicago, and Andrew F. Wintercorn, Rockford, Ill., assignors of one-third each to Walter F. Wintercorn and Agostino Gregori, Chicago, and Andrew F. Wintercorn, Rockford, Ill.

Original No. 3,467,966, dated Sept. 23, 1969, Ser. No. 528,988, Feb. 21, 1966. Application for reissue Oct. 8, 1969, Ser. No. 877,913

Int. Cl. A47k *3/22, 11/08*

U.S. Cl. 4—7 22 Claims

Matter enclosed in heavy brackets [ ] appears in the original patent but forms no part of this reissue specification; matter printed in italics indicates the additions made by reissue.

ABSTRACT OF THE DISCLOSURE

A wall cabinet has a hinged door which when closed conceals the folded bidet pan, its foldable prop, and all of its plumbing connections provided in the wall. With the door open, the bidet pan can be swung down to operative position, the prop therefor being automatically positioned therebeneath to rest on the floor. Hot and cold water valves are then adjustable manually to secure a flow of water in the amount and at the desired temperature, determined by a test nozzle discharging into the rear portion of the bidet pan. A spring pressed valve switches the flow from the test nozzle to the bidet nozzle in the pan when the latter is depressed in sitting upon it, this valve, being operated automatically by a link connection with the pan. The valves, test nozzle and link connection are all compactly arranged to fit in the hollow of the bidet pan when it is folded.

This invention relates to bidets, and is more particularly concerned with one designed to be swingable outwardly from a wall cabinet and back into it, so as to be out of the way as well as out of sight when not in use, a hinged door or doors being provided as a closure or closures on the front of the cabinet, which may or may not come flush with the wall, depending, of course, on the amount of space available in the wall. Thus, this device can be installed in relatively small bathrooms where a separate bidet bowl of the conventional fixed type could not be used because of lack of space, or would not be considered advisable even if it were possible to install it, because of the crowding involved.

Other features of the present invention are:

(1) Utilization of a bearing on one side wall of the cabinet for pivotal support of one of two coaxial trunnions on the opposite sides of the bidet pan and utilization of a swivel joint on the upper end of a vertical drain pipe on the other side of the pan for pivotal support of the other trunnion on that side;

(2) Adaptation of the shower type mixing valve between the hot and cold water inlet valves to a new use in this bidet for first testing the water temperature as well as its volume preliminary to the use of the bidet nozzle, so that after the two regulating hand valves have been adjusted properly to supply water in the right amount and at the right temperature to a testing nozzle discharging into the rear portion of the pan, a knob on the mixing valve can be shifted when the operator is seated on the pan to switch the delivery of water to the bidet nozzle so long as the bidet is in use, the knob being shifted back again as soon as the washing operation is over, after which the two valves can be closed, the flow from the testing nozzle after the washing operation being then useful in rinsing out the pan if there is any need for it;

(3) Provision of means whereby the mixing valve is held automatically in the by-pass or testing position under spring pressure and is arranged to be automatically shifted to the operative position for delivery of water to the bidet nozzle when the pan is pressed downwardly against the spring pressure by the operator sitting on it, this automatic operation having the advantage that the valve is immediately returned automatically to by-pass position when the operator gets off the pan;

(4) Provision of a prop pivoted to the underside of the pan near the outer end to support it adequately from the floor, the prop being of suitable width transversely with respect to the pan and having feet on opposite sides of the lower end thereof threadedly adjustable vertically to enable adapting the prop to any unevenness in the floor for best possible support, thus relieving the mounting trunnions on the rear portion of the pan of any unnecessary strain, the prop being preferably unfoldable automatically by means of a link connection between the lower end thereof and the cabinet, so that proper positioning of the prop for best support is always insured, and (5) Provision of a handle on the outer end of the pan to facilitate unfolding and folding of the pan and so located as to make for good sanitation in the handling of the bidet.

The invention is illustrated in the accompanying drawings, in which.

Figure 2:
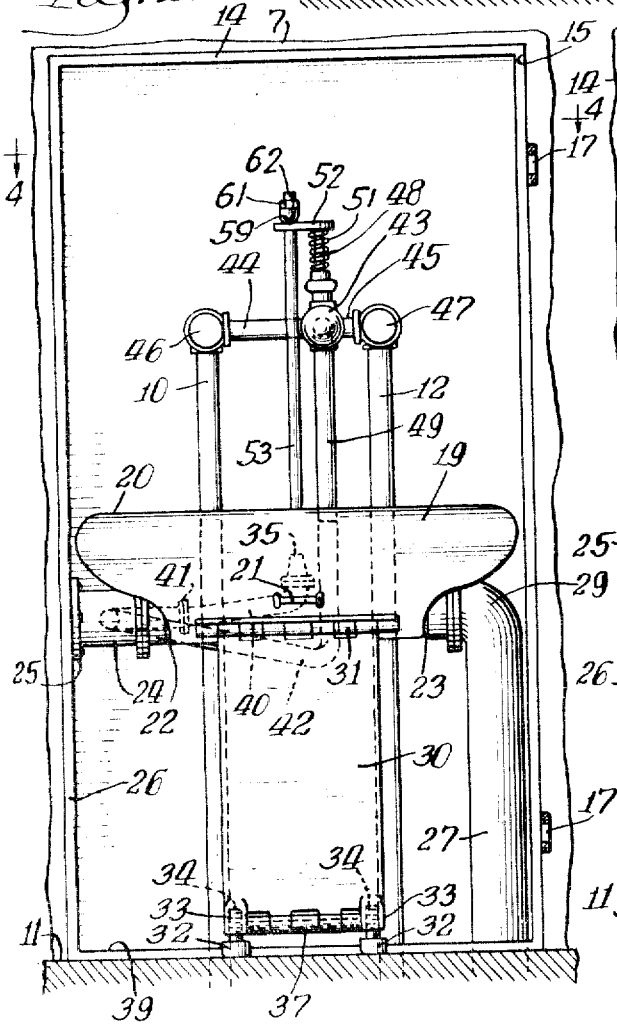
FIGS. 2 and 3 are front views of the bidet, showing it unfolded for use in FIG. 2, and folded back into the cabinet in FIG. 3, the hinged door being omitted in both of these views.
Figure 3:
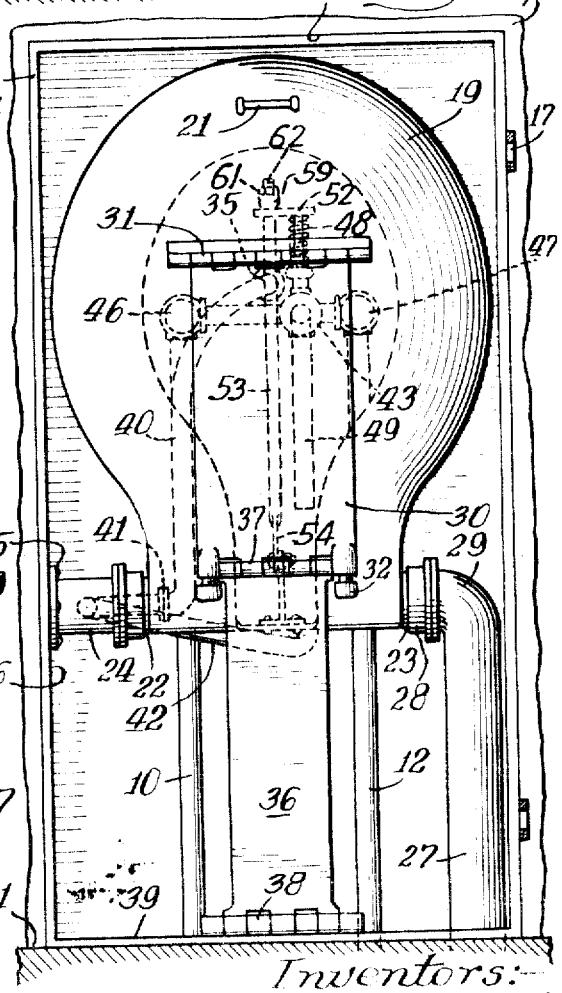
Figure 4:
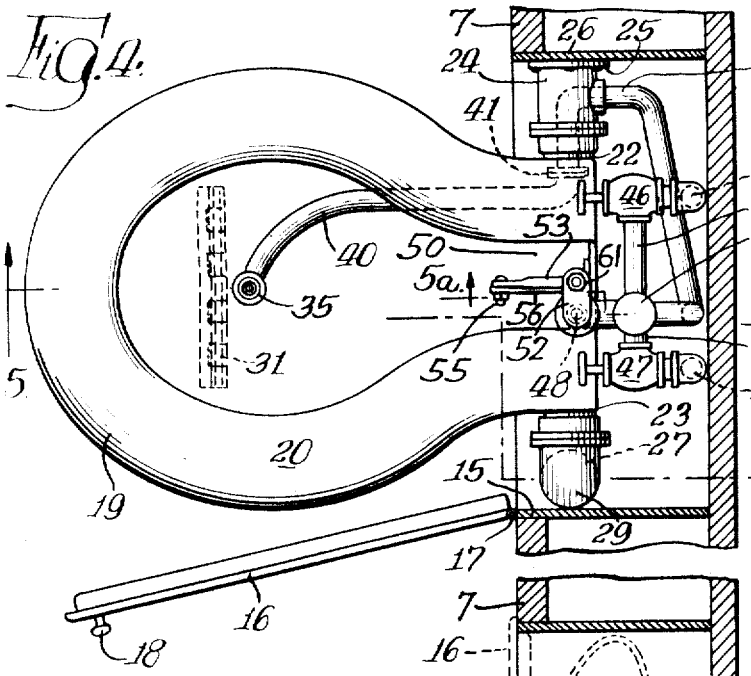
Figure 5A:
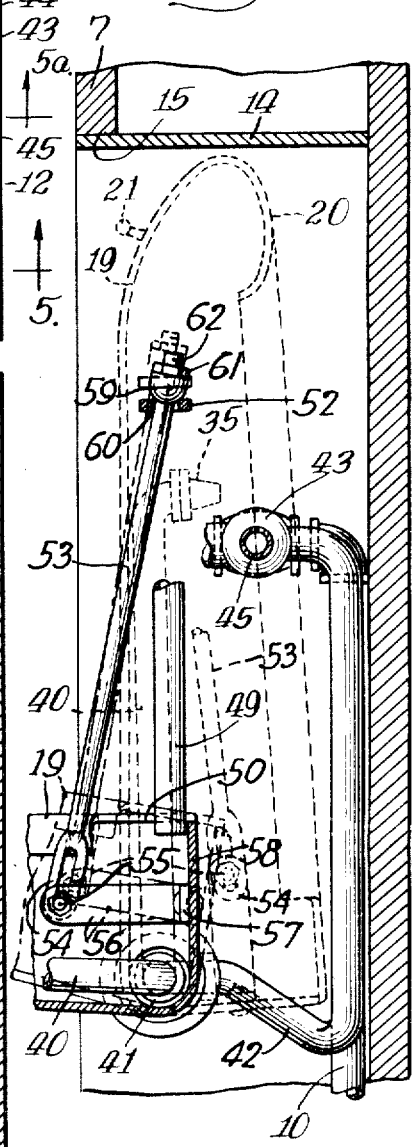
Figure 5:
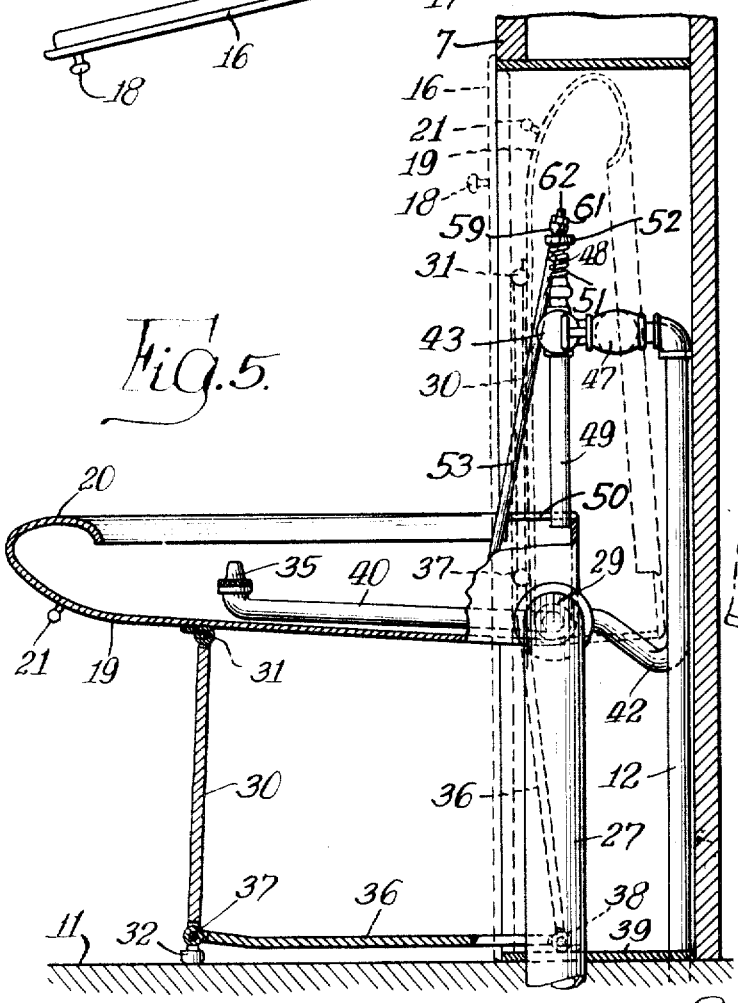

FIG. 4 is a plan view on the same scale as FIGS. 2 and 3 showing the cabinet end of the structure in section on the line 4—4 of FIG. 2, FIG. 5 is a vertical section on the broken line 5—5 of FIG. 4, and FIG. 5a is a vertical section on line 5a—5a of FIG. 4, indicated by full line and dotted line positions of the pan how automatic operation of the spring pressure valve is obtained by depression of the pan in sitting on it.

The same reference numerals are applied to corresponding parts throughout these views.

Figure 1:
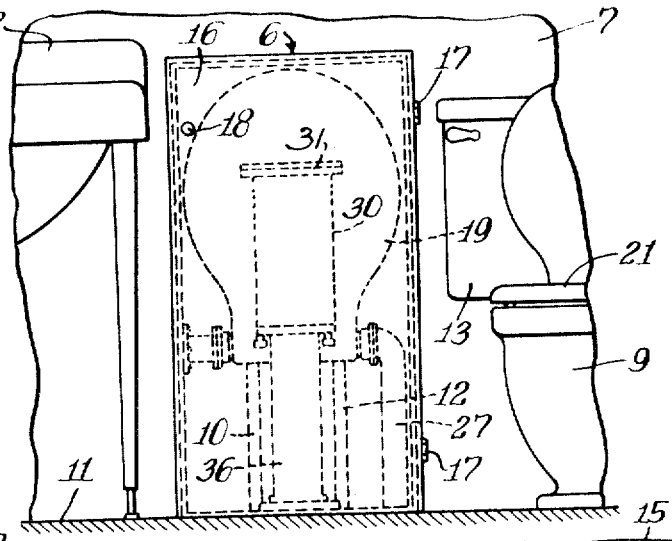
FIG. 1 is a general view showing our improved bidet in dotted lines in folded position in a wall cabinet concealed behind the door thereof.

Referring to the drawings, the reference numeral 6 in FIG. 1 designates our improved cabinet-type bidet installed in a wall 7 between a lavatory 8 and a toilet bowl 9, such location, where possible, being best because of the short connections required to nearby hot and cold water pipes extendings to the lavatory 8, as well as the shorter sewer connections required by tying in with the sewer connections for the toilet bowl 9. The hot water pipe 10, although shown in FIGS. 2 and 3 as extending vertically downwardly through the floor 11 may be extended laterally for connection with the hot water pipe supplying the lavatory 8, while the cold water pipe 12 shown in FIGS. 2 and 3 as extending vertically downwardly through the floor 11 may be extended laterally for connection with the cold water pipe supplying the flushing tank 13 for the toilet bowl 9.

The bidet 6 of our invention comprises a cabinet 14 of generally rectangular form adapted to be set in an opening 15 cut therefor in the wall 7 and having a door 16 hinged as at 17 and having a knob 18 for manipulating the same, any suitable detent means (not shown) being provided for holding the door closed. Two half-width doors could be used, hinged on opposite sides of the cabinet. The cabinet 14 in some cases will be flush with the wall 7, but in others will project slightly from the wall, depending, of course, on the amount of space available between the walls. 19 is the bidet pan, the shape of which is similar to a toilet seat, the same having an inwardly projecting rim 20 on the top which is disposed at substantially the same elevation as the seat 21 on the toilet bowl 9 when the pan 19 is disposed in its horizontal operative position, as shown in FIGS. 2, 4, and 5. A handle 21 provided on the outer end of the pan on the under side makes it convenient to move the pan from its folded position of FIGS. 1 and 3 to the operative position of FIGS. 2, 4 and 5, and, of course, facilitates returning the pan to the folded position after use, while making such operation more sanitary by eliminating the necessity for touching any of the seat areas around the rim 20. The pan 19 has trunnions 22 and 23 coaxially arranged on opposite sides at the inner end of the pan, trunnion 22 being pivotally mounted in a bearing 24 suitably rigidly secured, as indicated at 25, to the adjacent side wall 26 of the cabinet 14, while the other trunnion 23 serves as a drain connection, communicating with the vertical drain pipe 27 and suitably swivelled in a bearing 28 provided on the upper elbow end 29 of said pipe. In its horizontal operative position, the pan 19 rests on a prop 30 of generally rectangular form having a piano hinge connection 31 at its upper end with the underside of the pan near the front or outer end thereof and having feet 32 suitably threadedly adjustable vertically in knuckles 33 as indicated by the screws 34 to adapt the prop 30 to any unevenness in the floor 11 by proper adjustment of the feet 32 upwardly or downwardly with respect to one another and thus assure solid support for the pan 19 regardless of such unevenness in the floor. The prop 30 is wide enough in relation to the width of the pan 19 to assure adequate support and thus relieve the trunnions 22 and 23 of unnecessary strain. Furthermore, the prop will assume most of the weight in the use of the bidet, as should be evident from the location of the bidet nozzle 35 shown in FIGS. 4 and 5 directly over the prop. A link 36 pivotally connected at one end, as at 37, to the lower end of the prop 30, and hingedly connected, as at 38, at its other end to the bottom wall 39 of the cabinet 14, serves automatically to position the prop 30 correctly with respect to the pan 19 when the pan is swung outwardly to operative position.

Water is delivered to the bidet nozzle 35 through a pipe 40 disposed in the bottom of the pan 19 and extending rearwardly and laterally from the nozzle 35 to the trunnion 22 where the pipe has a swivel connection, indicated at 41, with one leg of the generally U-shaped pipe connection 42 leading through the center of bearing 24 and trunnion 22 to the swivel connection 41, the other leg of the U-connection 42 being connected with a mixing valve 42, to which hot and cold water is supplied from opposite sides through connections 44 and 45, respectively, from the aforementioned pipes 10 and 12 through regulating valves 46 and 47, respectively, that are hand-operable, as indicated. This mixing valve is similar to that shown in Mueller Patent 1,532,433, and has a manually reciprocable plunger 48, which, in its up position, causes valve 43 to deliver water to a testing nozzle or pipe 49 that discharges downwardly into the rear cutaway portion 50 of the pan 19. In its down position, the plunger 48 causes valve 43 to deliver water through the U-shaped pipe connection 42 and pipe 40 to the bidet nozzle 35. Thus, the operator can, prior to using the bidet, open and regulate the hot and cold water valves 46 and 47 with plunger 48 in its up position to test the water at the lower end of the nozzle or pipe 49 for temperature and flow before having the water discharged from the bidet nozzle 35 for the washing operation. A coiled compression spring 51 caged on the plunger 48 between the valve 43 and a radius arm 52 fixed on the upper end of the plunger and extending laterally therefrom as seen in FIGS. 2, 3, and 4, serves to hold the plunger normally in the up position, and, in so doing, also supports the pan 19 by means of link 53 in a slightly elevated position as seen in dot-dash lines in FIG. 5a with the prop 30 raised off the floor a few inches, the link 53 being slidably and pivotally connected at its longitudinally slotted lower end 54, as at 55, to a bracket 56 rigidly secured as at 57 to the rear wall 58 of the pan 19, while the upper end of the link has an adjustable pivotal connection 59 with the radius arm 52 in a hole 60, the connection including an adjusting nut 61 threadedly adjustable on the threaded upper end 62 of the link so as to enable fine adjustment of the link connection between the pan 19 and the arm 52, so that the prop 30 need not be kept raised any higher off the floor than necessary for automatic operation of the mixing valve 43 from by-pass to operative position.

The operation should be clear from the foregoing description. When the bidet is to be used, the pan 19 is swung outwardly from the cabinet 14 by means of handle 21 after the door 16 has been opened. The pan 19 will come to rest in the upwardly inclined position indicated in dotted lines in FIG. 5a with the feet 32 on prop 30 in slightly elevated relation to the floor 11, due to the action of spring 51 holding plunger 48 and arm 52 in the up position. The valves 46 and 47 are opened and then regulated to obtain the desired flow of water at suitable temperature from the testing nozzle or pipe 49. Then, the operator seats himself on the pan 19, thereby causing a downward pull on the link 53 to shift the plunger 48 of valve 43 from by-pass position to operative position against the action of spring 51, the water being then discharged from the bidet nozzle 35. After the washing operation is completed, the operator stands up and the pan 19 is automatically raised by means of the spring 51, which, at the same time, returns the plunger 48 to the by-pass position so that the water is discharged from the testing nozzle or pipe 49 for as long as the operator may wish in the event it is necessary to rinse out the pan before the water is shut off by closing valves 46 and 47. The pan 19 is finally swung up back into the cabinet by means of handle 21 and then the door 16 is closed. The lost motion connection at 55 avoids interference between the valve operating link mechanism 53 and the pan 19, so that the valve 43 and all of its operating mechanism can be housed in the pan in folded position as should be clear from FIG. 3 and the dotted line position of the pan in FIG. 5a. The present bidet can, of course, be made ready for use before the operator is seated on the toilet seat 21, as that will not result in a waste of much water. This bidet offers big advantages over the old conventional bidets where the water has to be turned on after the operator is seated, and that requires real dexterity to manipulate the valves by reaching around from first one side and then the other to repeatedly regulate the hot and cold water valves provided on the rear of the bowl. Rarely does one get the water regulated to the desired temperature or force that way, and it is not uncommon to get water either far too hot or far too cold.

It is believed the foregoing description conveys a good understanding of the objects and advantages of our invention. The appended claims have been drawn to cover all legitimate modifications and adaptations.

We claim:

1. A bidet of the character described comprising a substantially vertical open front cabinet adapted to be set in a wall, a bidet pan which in its operative position extends forwardly from the open front of said cabinet and is disposed substantially horizontally at the approximate level of a toilet seat relative to a floor but is adapted to be folded upwardly into the cabinet, there being trunnions on the rear end of said pan in horizontal coaxial relationship pivotally mounting said pan in bearings provided therefor on the inside of said cabinet, one of these trunnions being a hollow swivel drain connection communicating with the inside of said pan, means limiting pivotal movement of said pan relative to said cabinet for support thereof in its unfolded operative position extending from said cabinet, said means comprising a floor engaging prop pivoted to the pan at one end and at the other end to one end of a link that has pivotal connection with said cabinet to swing said prop into supporting position when the pan is swung out to operative position, a bidet nozzle in said pan, valve means in said cabinet connected to said bidet nozzle in fixed relation to said pan and adapted to be connected with sources of hot and cold water supply and having means for manual operation thereof, and closure means for the open front of said cabinet operable independently of the pan.

2. A bidet as set forth in claim 1 wherein the valve means is provided in said cabinet in fixed relationship thereto, said bidet pan being movable to and from its unfolded operative position relative to said valve means, the bidet including a test nozzle connected with said valve means and arranged to discharge into the rear portion of said pan when said valve means is in one of two positions, and means connecting said pan with said valve means whereby the latter is operable to the other position in response to a predetermined pivotal movement of said pan to cut off flow from said test nozzle and direct it to said bidet nozzle.

3. A bidet as set forth in claim 2 including spring means normally urging said valve means in one direction directing the flow to said test nozzle, and means connecting said pan with said valve means whereby the latter is operable when a person sits on said pan and causes a predetermined pivotal movement thereof to shift said valve means in another direction against the action of said spring means to the other position directing flow to said bidet nozzle, the flow returning to said testing nozzle when the person gets off said pan.

4. A bidet as set forth in claim 1 wherein the bidet nozzle has a conduit extending rearwardly therefrom to that one of said trunnions opposite the drain connection trunnion where the conduit has a swivel connection in coaxial relation with said trunnion and its bearing with a second conduit extending through the said bearing and trunnion into said pan to said swivel connection, the second conduit connecting the valve means with said bidet nozzle through said first conduit and swivel connection.

5. A bidet as set forth in claim 1 including a testing nozzle extending downwardly from said valve means for discharge into the rear end of said pan and arranged to be housed for compactness with said valve means in said pan in its folded position, and means connecting said pan with said valve means for switching the flow from said testing nozzle to said bidet nozzle in response to a predetermined pivotal movement of said pan.

6. A bidet as set forth in claim 1 including a testing nozzle extending downwardly from said valve means for discharge into the rear end of said pan and arranged to be housed for compactness with said valve means in said pan in its folded position, spring means urging said valve means normally in one direction, directing flow to said testing nozzle, and link means pivotally interconnecting said bidet pan with said valve means so that said spring means serves to hold said bidet pan normally in slightly elevated position relative to a horizontal operative position until a person sits on said bidet pan, whereupon said link connection shifts said valve means to another position against the action of said spring means to shut off flow from said testing nozzle and direct flow from said valve means to said bidet nozzle, said spring means serving to return said valve means to its first position continuing flow from said testing nozzle when the person relieves his weight from said bidet pan.

7. A bidet as set forth in claim 6 wherein said link connection for compactness is also enclosed in said bidet pan in its folded position.

8. A bidet as set forth in claim 6 including a lost-motion pivotal connection between one end of said link and said bidet pan, allowing folding and unfolding movement of said bidet pan through a predetermined range independently of any endwise movement of said link.

9. A bidet as set forth in claim 6 including a threaded adjustment on one end of said link predetermining the extent of elevation of said bidet pan above a normal operative position prior to a person sitting on the pan.

10. A bidet as set forth in claim 1 wherein said prop is of generally rectangular form and of appreciable width in relation to the width of said pan and disposed with the middle of the prop on the longitudinal center line of the pan, said prop having feet vertically adjustable relative to the lower end thereof and disposed on opposite sides of a vertical plane through said center line of said pan to rest on the floor and compensate by the adjustment thereof for unevenness of the floor.

11. A bidet as set forth in claim 1 wherein the valve means provided in said cabinet in fixed relation to said pan is arranged to be housed for compactness in said pan in the folded position of the latter.

*12. A bidet comprising supporting means, a bidet pan which in its operative position extends forwardly from said support means and is disposed substantially horizontally at the approximate level of a toilet seat relative to a floor, but is adapted to be folded upwardly to a substantially vertical position, there being trunnions on the rear end of said pan in horizontal coaxial relationship, pivotally mounting said pan in bearings provided therefor on said support means, one of these trunnions being a hollow swivel drain connection communicating with the inside of said pan, means limiting pivotal movement of said pan relative to said support means for support thereof in its unfolded operative position extending forwardly from said support means, said limiting means comprising a floor engaging prop pivoted to the pan at one end and at the other end to one end of the link that has pivotal connection with said support means to swing said prop into supporting position when the pan is swung out to operative position, a bidet nozzle in said pan, and valve means connected to said bidet nozzle in a fixed relation to said pan and adapted to be connected with sources of hot and cold water supply and having means for manual operation thereof.*

*13. A bidet as set forth in claim 12 wherein the valve means is provided in a fixed relationship to said support means, said bidet pan being movable to and from its unfolded operative position relative to said valve means, the bidet including a test nozzle connected with said valve means and arranged to discharge into the rear portion of said pan when said valve means is in one of two positions, and means connecting said pan with said valve means whereby the latter is operable to the other position in response to a predetermined pivotal movement of said pan to cut off flow from the test nozzle and direct it to said bidet nozzle.*

*14. A bidet as set forth in claim 13, including spring means normally urging said valve means in one direction directing the flow to said test nozzle, and means connecting said pan with said valve means whereby the latter is operable when a person sits on said pan and causes a predetermined pivotal movement thereof to shift said valve means in another direction against the action of said spring means to the other position directing flow to said bidet nozzle, the flow returning to said test nozzle when the person gets off the pan.*

*15. A bidet as set forth in claim 12, wherein the bidet nozzle has a conduit extending rearwardly therefrom to that one of said trunnions opposite the drain connection trunnion where the conduit has swivel connection in coaxial relation to said trunnion and its bearing with a second conduit extending through said bearing and trunnion into said pan to said swivel connection, the second conduit connecting the valve means with said bidet nozzle through said first conduit and swivel connection.*

*16. A bidet as set forth in claim 12, including a test nozzle extending downwardly from said valve means for discharge into the rear end of said pan and arranged to be housed for compactness with said valve means in said pan in its folded position, and means connecting said pan*

*with said valve means for switching the flow from said test nozzle to said bidet nozzle in response to a predetermined pivotal movement of said pan.*

*17. A bidet as set forth in claim 12, including a testing nozzle extending downwardly from said valve means for discharge into the rear end of said pan and arranged to be housed for compactness with said valve means in said pan in its folded position, spring means urging said valve means normally in one direction, directing flow to said testing nozzle, and link means pivotally interconnnecting said bidet pan with said valve means so that said spring means serves to hold said bidet pan normally in slightly elevated position relative to a horizontal operative position until a person sits on said bidet pan, whereupon said link connection shifts said valve means to another position against the action of said spring means to shut off flow from said testing nozzle and direct flow from said valve means to said bidet nozzle, said spring means serving to return said valve means to its first position continuing flow from said testing nozzle when the person relieves his weight from said bidet pan.*

*18. A bidet as set forth in claim 17, wherein said link connection for compactness is also enclosed in said bidet pan in its folded position.*

*19. A bidet as set forth in claim 17, including a lost-motion pivotal connection between one end of said link and said bidet pan, allowing folding and unfolding movement of said bidet pan through a predetermined range independently of any endwise movement of said link.*

*20. A bidet as set forth in claim 17, including a threaded adjustment on one end of said link predetermining the extent of elevation of said bidet pan above a normal operative position prior to a person sitting on the pan.*

*21. A bidet as set forth in claim 12, wherein said prop is of generally rectangular form and of appreciable width in relation to the width of said pan and disposed with the middle of the prop on the longitudinal center line of the pan, said prop having feet vertically adjustable relative to the lower end thereof and disposed on opposite sides of a vertical plane through said center line of said pan to rest on the floor and compensate by the adjustment thereof for unevenness of the floor.*

*22. A bidet as set forth in claim 12, wherein the valve means provided in a fixed relation to said pan is arranged to be housed for compactness in said pan in the folded position of the latter.*

References Cited

The following references, cited by the Examiner, are of record in the patented file of this patent or the original patent.

UNITED STATES PATENTS

| | | | |
|---|---|---|---|
| 515,468 | 2/1894 | Grafstrom | 4—7 |
| 628,162 | 7/1899 | Lely | 4—7 |
| 677,672 | 7/1901 | Libby | 4—6 |
| 866,251 | 9/1907 | Alohikea | 4—6 |
| 951,604 | 3/1910 | Fuller | 4—112 |
| 1,225,914 | 5/1917 | Wood | 4—10 |
| 1,234,643 | 7/1917 | Doyle et al. | 4—249 |
| 1,532,433 | 4/1925 | Mueller | 4—148 |
| 2,075,830 | 4/1937 | Salvoni | 4—6 |
| 2,080,438 | 5/1937 | Salvoni | 4—6 |
| 2,094,170 | 9/1937 | Heald | 4—7 |
| 2,219,437 | 10/1940 | Andersen et al. | 4—10 |
| 2,567,025 | 9/1951 | Osterhage | 4—10 |
| 2,711,207 | 6/1955 | Roth | 4—134 |
| 2,725,575 | 12/1955 | Colonna | 4—10 |

FOREIGN PATENTS

| | | | |
|---|---|---|---|
| 400,355 | 6/1909 | France | 4—6 |
| 738,526 | 10/1932 | France | 4—6 |
| 845,962 | 5/1939 | France | 4—7 |
| 188,856 | 9/1907 | Germany | 4—6 |
| 204,793 | 8/1939 | Switzerland | 4—7 |

LAVERNE D. GEIGER, Primary Examiner

H. K. ARTIS, Assistant Examiner